(12) United States Patent
Adam et al.

(10) Patent No.: US 10,361,927 B2
(45) Date of Patent: Jul. 23, 2019

(54) MANAGING RISK IN MULTI-NODE AUTOMATION OF ENDPOINT MANAGEMENT

(71) Applicant: International Business Machines Corporation, Armonk, NY (US)

(72) Inventors: Constantin M. Adam, Norwalk, CT (US); Shang Q. Guo, Cortlandt manor, NY (US); Rajeev Puri, Huntersville, NC (US); Yaoping Ruan, White Plains, NY (US); Cashchakanith Venugopal, Naperville, IL (US); Frederick Y. Wu, Cos Cob, CT (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/503,254

(22) Filed: Sep. 30, 2014

(65) Prior Publication Data

US 2015/0200959 A1   Jul. 16, 2015

Related U.S. Application Data

(60) Provisional application No. 61/927,332, filed on Jan. 14, 2014.

(51) Int. Cl.
*H04L 12/24* (2006.01)
*H04L 29/06* (2006.01)
*G06F 11/34* (2006.01)

(52) U.S. Cl.
CPC .............. *H04L 41/50* (2013.01); *H04L 63/14* (2013.01); *G06F 11/3442* (2013.01)

(58) Field of Classification Search
CPC ...... G06F 21/10; G06F 21/577; G06F 21/604; G06F 21/55; G06F 9/5038; H04L 63/1433; H04L 63/10; H04L 63/08; G06Q 10/067
(Continued)

(56) References Cited

U.S. PATENT DOCUMENTS

| 6,397,359 | B1 | 5/2002 | Chandra |
| 6,625,648 | B1 | 9/2003 | Schwaller |

(Continued)

FOREIGN PATENT DOCUMENTS

JP   2011103121   5/2011

OTHER PUBLICATIONS

Aaron B. Brown et al., "Reducing the Cost of IT Operations—Is Automation Always the Answer?", IBM Research Report, Feb. 2, 2005.

(Continued)

*Primary Examiner* — Bryan F Wright
(74) *Attorney, Agent, or Firm* — Kristofer Haggerty; Otterstedt, Wallace & Kammer, LLP

(57) ABSTRACT

It is determined whether a user is authorized to carry out a management operation on a plurality of information technology assets in parallel, based on a role of the user and at least one characteristic of the management operation. A risk level of the management operation, and at least one characteristic of the plurality of information technology assets, are both determined. Based on the risk level and the at least one characteristic of the plurality of information technology assets, an execution pattern for the management operation is specified. In at least some cases, the management operation is carried out on the plurality of information technology assets in parallel, in accordance with the execution pattern.

22 Claims, 12 Drawing Sheets

(58) Field of Classification Search
USPC .......................................................... 726/25
See application file for complete search history.

(56) References Cited

U.S. PATENT DOCUMENTS

| | | | |
|---|---|---|---|
| 7,085,822 B1 | 8/2006 | Donatelli | |
| 7,814,190 B2 | 10/2010 | Kacin | |
| 8,181,253 B1* | 5/2012 | Zaitsev | G06F 21/552 |
| | | | 713/152 |
| 8,200,749 B2 | 6/2012 | Behrendt | |
| 8,239,915 B1 | 8/2012 | Satish | |
| 8,458,301 B1 | 6/2013 | Andrus | |
| 8,782,782 B1* | 7/2014 | Dicovitsky | H04L 63/102 |
| | | | 706/48 |
| 8,918,774 B2* | 12/2014 | Hansmann | G06F 8/68 |
| | | | 717/168 |
| 2006/0218639 A1* | 9/2006 | Newman | G06F 21/10 |
| | | | 726/25 |
| 2006/0259911 A1* | 11/2006 | Weinrich | G05B 19/418 |
| | | | 719/315 |
| 2007/0226542 A1* | 9/2007 | Beeston | G06F 11/261 |
| | | | 714/33 |
| 2008/0229420 A1* | 9/2008 | Jeschke | H04L 63/1433 |
| | | | 726/25 |
| 2009/0018847 A1* | 1/2009 | Vanbeck | G06Q 10/0639 |
| | | | 705/348 |
| 2009/0164201 A1 | 6/2009 | Celli | |
| 2010/0050249 A1* | 2/2010 | Newman | H04L 63/126 |
| | | | 726/15 |
| 2010/0186020 A1* | 7/2010 | Maddhirala | G06F 9/5038 |
| | | | 718/105 |
| 2011/0066562 A1* | 3/2011 | Stapleton | G06F 21/604 |
| | | | 705/317 |
| 2012/0216243 A1* | 8/2012 | Gill | G06F 21/55 |
| | | | 726/1 |
| 2013/0010802 A1 | 1/2013 | Ansari | |
| 2013/0190899 A1* | 7/2013 | Slessman | G05B 13/02 |
| | | | 700/28 |
| 2013/0246105 A1* | 9/2013 | Winkler | G06Q 10/067 |
| | | | 705/7.11 |
| 2013/0268994 A1* | 10/2013 | Cooper | H04L 63/10 |
| | | | 726/1 |
| 2014/0122670 A1* | 5/2014 | Levy | H04L 41/0893 |
| | | | 709/220 |
| 2014/0350998 A1* | 11/2014 | Vinnakota | G06Q 10/0635 |
| | | | 705/7.28 |
| 2015/0101056 A1* | 4/2015 | Eberlein | G06F 21/577 |
| | | | 726/25 |
| 2016/0063192 A1* | 3/2016 | Johnson | G16H 40/20 |
| | | | 705/2 |

OTHER PUBLICATIONS

"An architectural blueprint for autonomic computing", Autonomic Computing, White Paper, Fourth Edition, Jun. 2006.

* cited by examiner

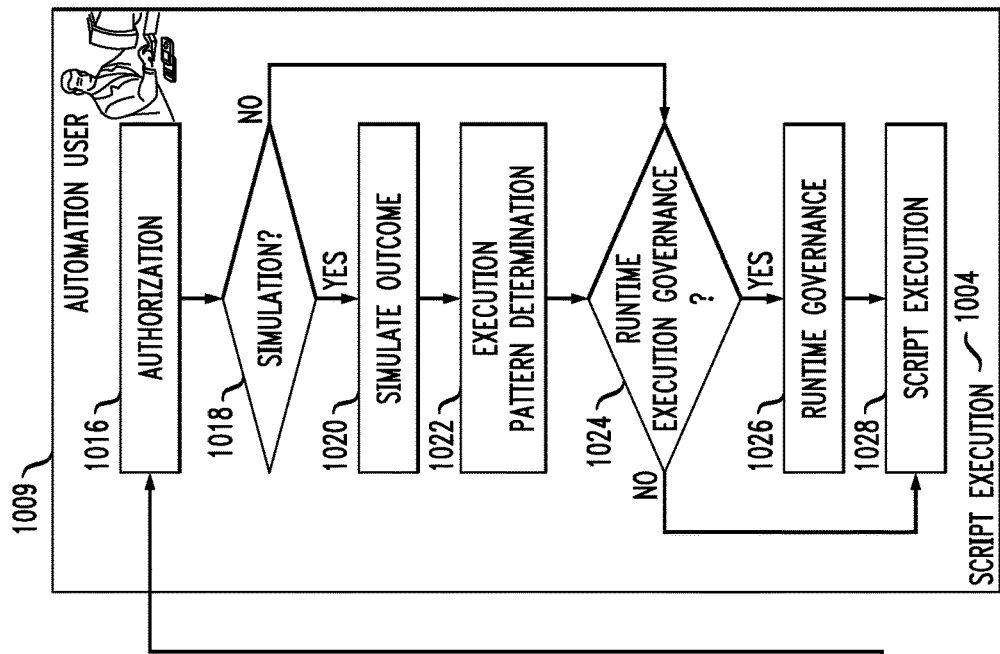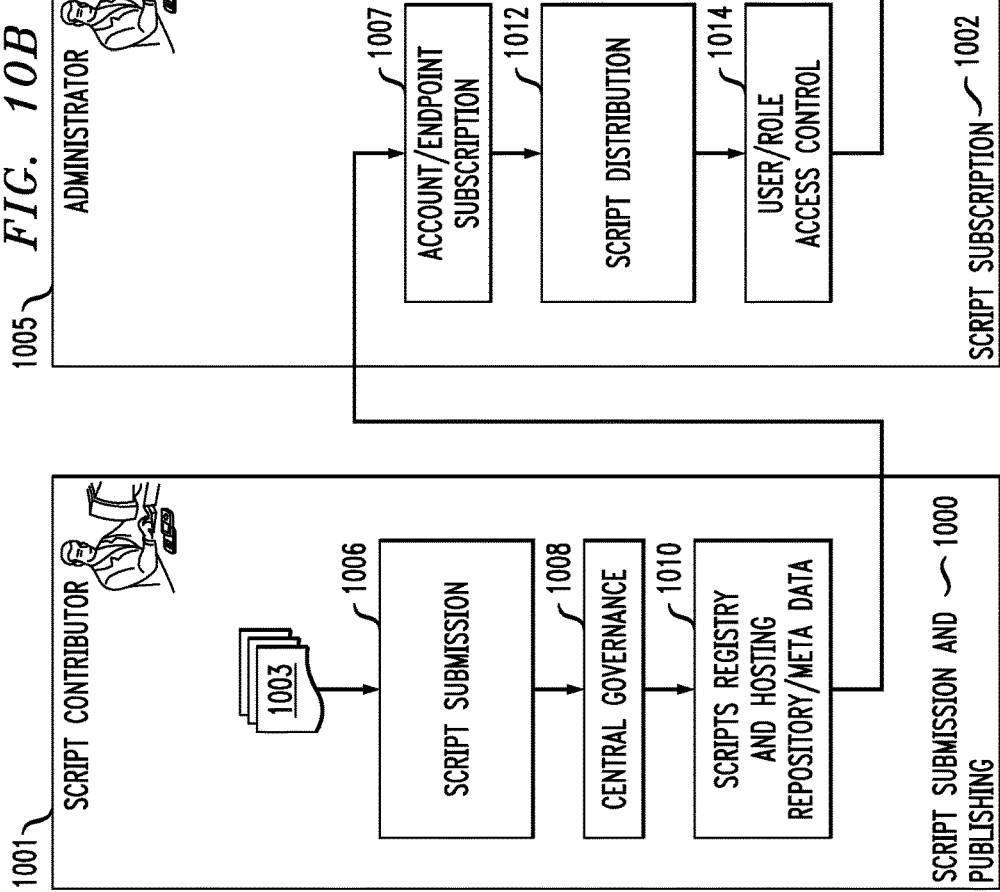
FIG. 10B

MANAGING RISK IN MULTI-NODE AUTOMATION OF ENDPOINT MANAGEMENT

CROSS-REFERENCE TO RELATED APPLICATIONS

This application claims the benefit of U.S. Provisional Patent Application Ser. No. 61/927,332, filed Jan. 14, 2014, entitled MANAGING RISK IN MULTI-NODE AUTOMATION OF ENDPOINT MANAGEMENT, the complete disclosure of which, including the Appendix to the Specification, is expressly incorporated herein by reference in its entirety for all purposes.

FIELD OF THE INVENTION

The present invention relates to the electrical, electronic and computer arts, and, more particularly, to service management and analytics, and the like.

BACKGROUND OF THE INVENTION

In the field of computer service management, competitive business pressures require using fewer people to manage more servers. One emerging non-traditional approach to achieve this is to perform management operations (e.g., run automation content such as commands, scripts or other executables) on a pool (more than one) of endpoints as opposed to one endpoint at a time. As used herein, an "endpoint" is an entity, device, processor or resource (e.g., servers, desktop computer, laptops, smart phones, tablets, thin clients, etc.) that can be referenced and to which messages/communications can be addressed. The productivity savings for such operations is proportional to the number of endpoints in the pool.

SUMMARY OF THE INVENTION

Principles of the invention provide techniques for managing risk in multi-node automation of endpoint management. In one aspect, an exemplary method includes the step of determining whether a user is authorized to carry out a management operation on a plurality of information technology assets in parallel. The determination is based on a role of the user and at least one characteristic of the management operation. Further steps include determining a risk level of the management operation; determining at least one characteristic of the plurality of information technology assets; based on the risk level and the at least one characteristic of the plurality of information technology assets, specifying an execution pattern for the management operation; and carrying out the management operation on the plurality of information technology assets in parallel, in accordance with the execution pattern.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one of the technical advantages is that it allows running the program on the endpoints remotely and checking the execution results in the console (single access point) without manually logging in to the endpoints. It also allows monitoring these accesses for audit purposes.

These and other features and advantages of the present invention will become apparent from the following detailed description of illustrative embodiments thereof, which is to be read in connection with the accompanying drawings.

BRIEF DESCRIPTION OF THE DRAWINGS

FIG. 10B presents a flowchart depicting details of an exemplary embodiment according to an aspect of the invention.

DETAILED DESCRIPTION OF PREFERRED EMBODIMENTS

In the field of computer service management, competitive business pressures require using fewer people to manage more servers. One emerging non-traditional approach to achieve this goal is to perform management operations (e.g., run automation content such as commands, scripts or other executables) on a pool (more than one) of endpoints or nodes as opposed to one endpoint at a time. As used herein, an "endpoint" is an entity, device, processor or resource (e.g., server, desktop computer, laptops, smart phones, tablets, thin clients, etc.) that can be referenced and to which messages/communications can be addressed. In this approach, the manual effort spent performing an action on a pool of endpoints is hardly more than the effort spent performing the same action on a single endpoint. The productivity savings for such operations is proportional to the number of endpoints in the pool. However, one of the drawbacks of this approach is an increasing risk of adverse impact to the data content and/or managed systems due to, for example, harmful operations (e.g., shutdowns, reboots, removing a database file to address a capacity system full issue), unauthorized access to automation content (management operations), illegal operations (e.g., unlicensed utilities, malware), human error, and exceptions. Herein, the terms "automation content" and "management operations" are used interchangeably.

One or more embodiments of the invention provide methods, apparatus and systems to control the risk at runtime for the parallel execution of server (or other endpoint) management operations. Server management operations include basic commands, or automation scripts and programs. In one embodiment, the method includes characterizing the servers, users, management operations and policies for risk management; profiling user eligibility and accessibility of managed servers, operations, etc.; and executing an algorithm to determine runtime execution patterns based on the characterization. The execution patterns include the size of the target server batches (e.g., number of endpoints in the pool), a sequence of execution, an execution schedule, runtime governance (e.g., manual control actions), and failure recovery actions to execute in the event the execution of the management operations fails. One or more embodiments of the invention reduce the risk of costly errors (e.g., outage, service-level agreement (SLA) violations and penalty) associated with the parallel execution of tasks on multiple endpoints. One or more embodiments of the invention reduce the administering services needed to execute tasks on multiple endpoints in parallel, thereby reducing costs and increasing efficiency. One or more embodiments increase the potential acceptance of automation tools.

Figure 1:
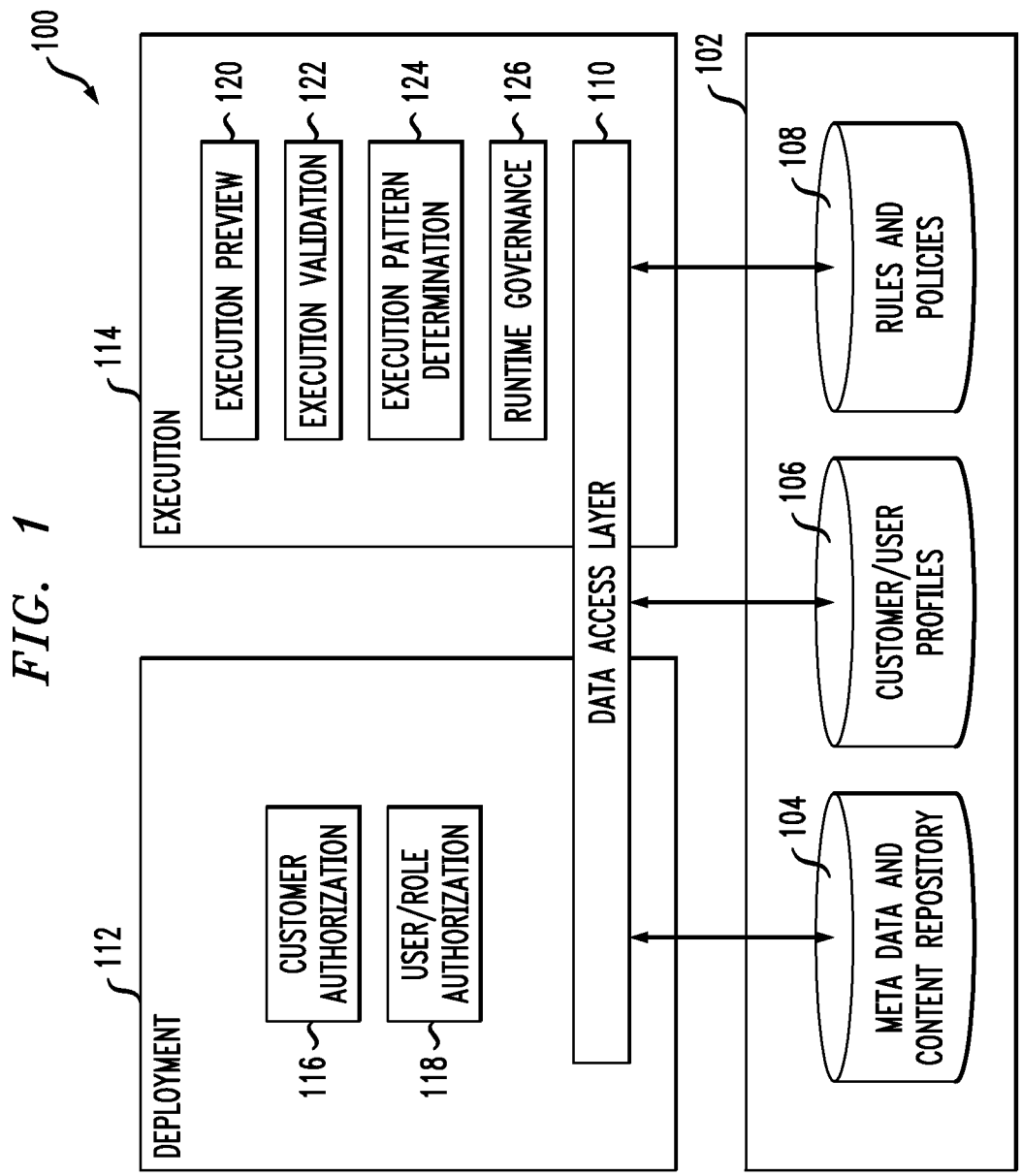
FIG. 1 presents a partial exemplary system diagram according to an aspect of the invention.

FIG. 1 shows a partial exemplary system diagram. The system 100 includes, in some embodiments, a data store 102. The data store 102 includes a meta-data and automation content repository 104, one or more customer and/or user profiles 106, and a rules and policies repository 108. A data access layer 110 provides access to the data store 102.

One or more embodiments include a deployment module 112 and an execution module 114. Deployment module 112 includes customer authorization sub-module 116 and user and/or role authorization sub-module 118. Execution module 114 includes execution preview sub-module 120, execution validation sub-module 122, execution pattern determination sub-module 124, and runtime governance sub-module 126. Please note, sub-modules may be referred to herein alternatively simply as modules, for linguistic convenience.

Figure 2:
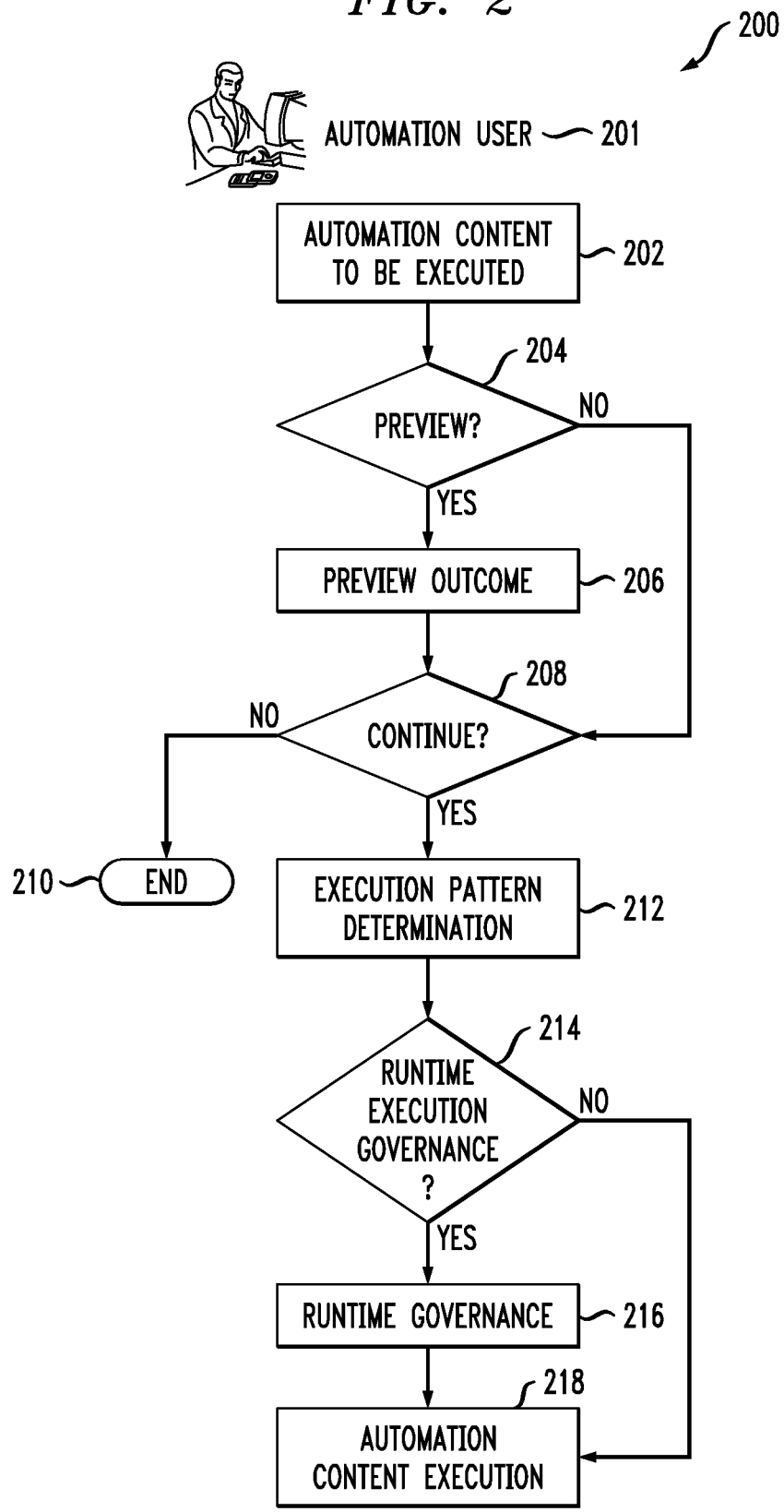
FIG. 2 presents a flowchart depicting details of an exemplary embodiment according to an aspect of the invention.

FIG. 2 is a flowchart depicting details of an exemplary embodiment. In particular, an exemplary method 200 for controlling execution of management operations on a pool of end points is provided. In step 202, automation content to be executed by an automation user 201 is provided. A determination is made in 204 whether to preview the outcome of the execution of the automation content. In one or more embodiments, the preview is obtained by simulating the execution of the automation content. (It is not only limited to simulation. It could pick a few servers to run; if it succeeds, then pick more servers for the next round. The number of servers to pick is determined by the execution rules.) If "yes" in 204 the outcome is previewed in 206, and a determination is made in 208 whether to continue execution of the automation content. In some embodiments, the execution preview module 120 provides the preview. If "no" in 204 the method 200 proceeds to 208 and a determination is made whether to continue execution of the automation content. If "no" in 208, the method ends at 210. If "yes" in 208 an execution pattern is determined in 212. In some embodiments, the execution pattern is determined by the execution pattern determination module 124. In decision block 214 it is determined whether runtime execution governance is desired. If "yes" in 214 the runtime governance is executed by the runtime governance module 126 in 216 and the automation content is executed in 218. If "no" in 214 the automation content is executed in 218.

Regarding runtime governance sub-module 126, in some cases, if a person is not otherwise authorized to carry out a management operation, an exception may be made via runtime governance.

Figure 3:
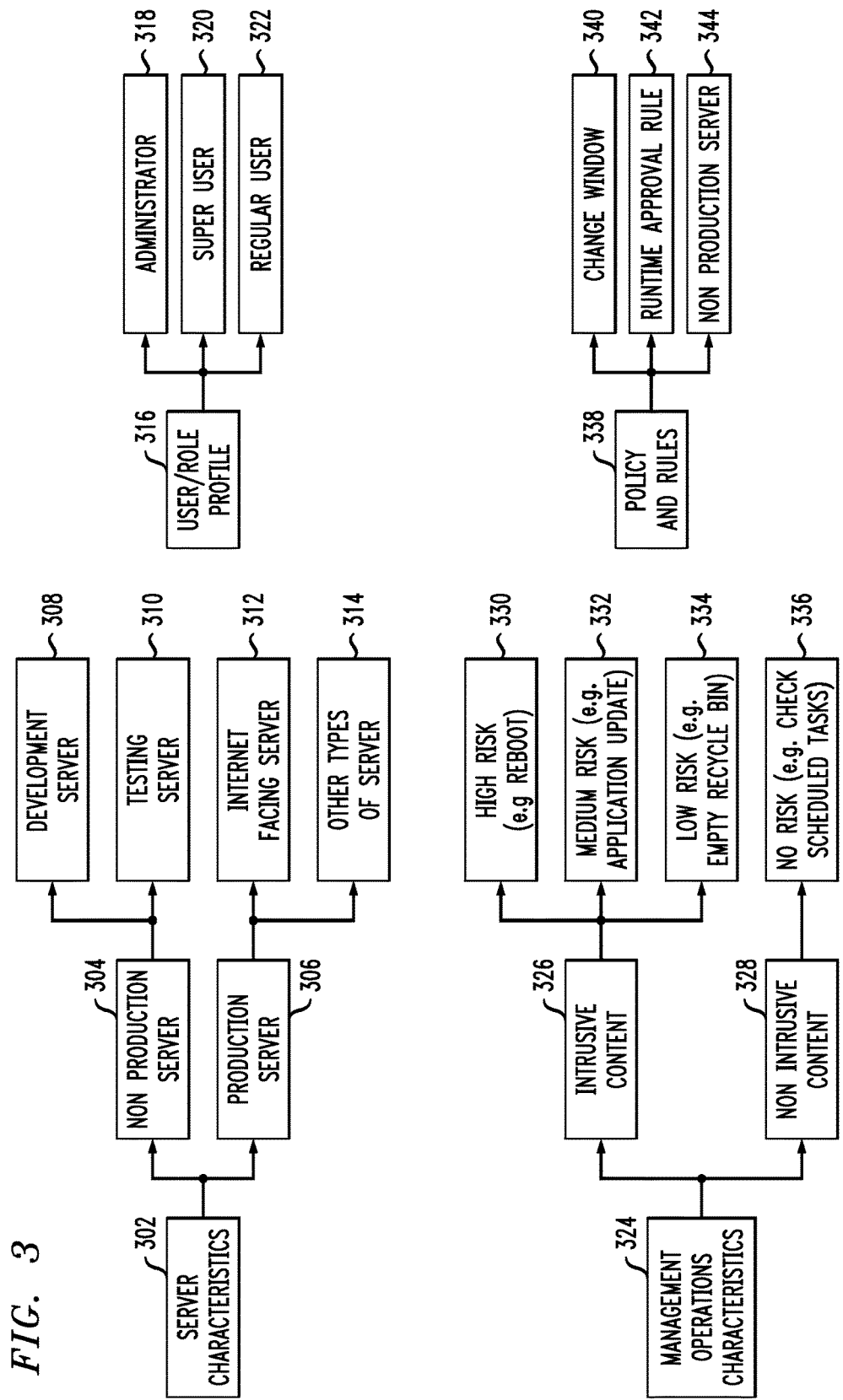
FIG. 3 depicts an exemplary characterization flow according to an aspect of the invention.

FIG. 3 depicts an exemplary characterization flow of non-limiting execution input categories (e.g., servers, users, management operations and policies) according to some embodiments of the invention. In some embodiments, the characterization of the servers, users, management operations and policies is used to determine runtime execution patterns, which minimize the risks associated with performing management operations on a pool of endpoints. For example, in some embodiments, with respect to server characteristics 302, servers are characterized as either non-production servers 304 or production servers 306. The non-production servers 304 are characterized as either development servers 308 or testing servers 310. The production servers 306 are characterized as either Internet facing servers 312 or other types of servers 314. In some embodiments, with respect to user/role profiles 316, for example, the profile is characterized as one of an administrator 318, a Super User 320 or a regular user 322. In some embodiments, with respect to management operations (automation content) characteristics 324, management operations are, for example, characterized as either intrusive content 326 or non-intrusive content 328. The intrusive content 326 is characterized as one of high risk (e.g., reboot) 330, medium risk (e.g., application update) 332, or low risk (e.g., empty recycle bin) 334. The non-intrusive content 328 is characterized as no risk (e.g., check scheduled tasks) 336. In one or more embodiments, with respect to policy and rules 338, the rules and policies are related to, for example, one of a change window 340, a runtime approval rule 342 and a non-production server 344. Other suitable characterizations may be used.

Figure 4:
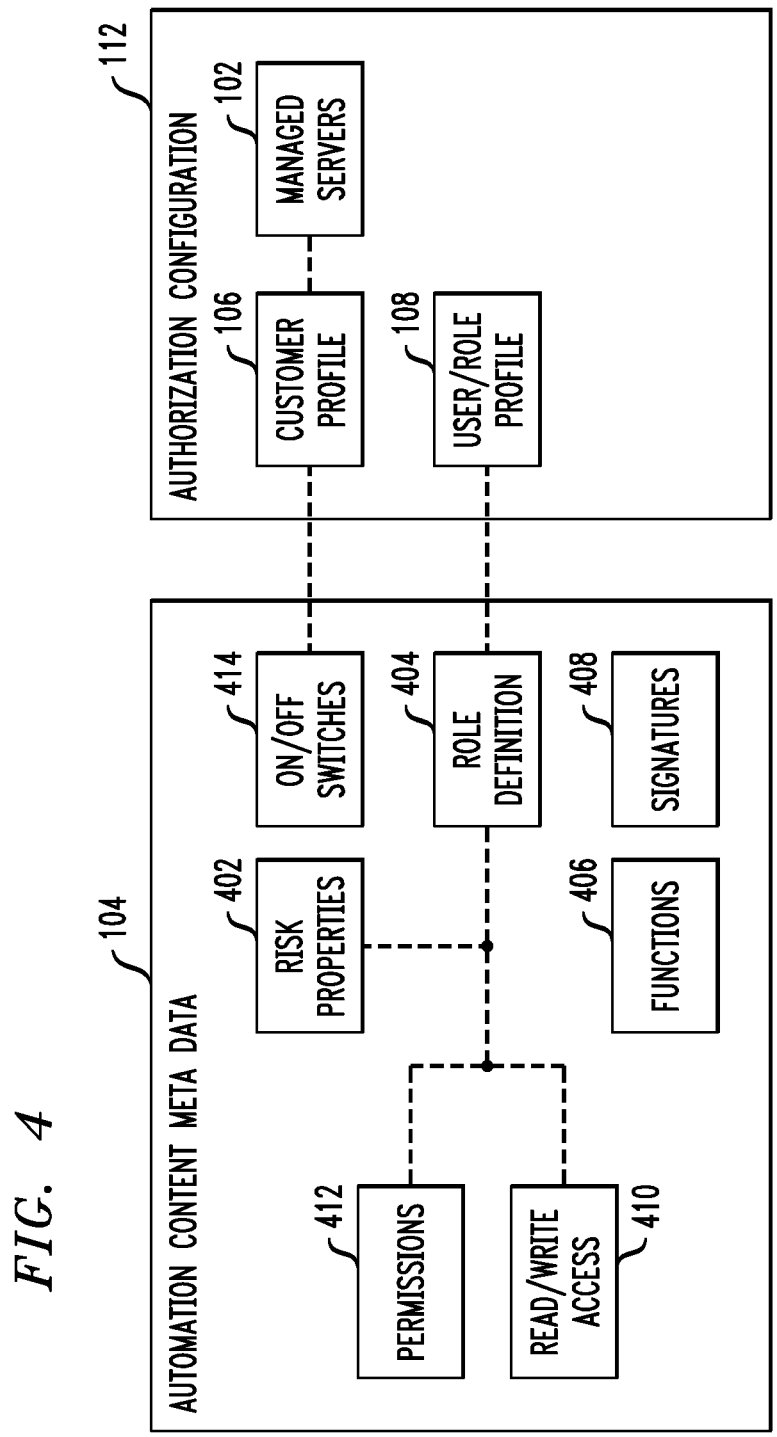
FIG. 4 depicts a block diagram according to an aspect of the invention.

FIG. 4 depicts a block diagram of server management operations authorization according to some embodiments of the invention. Profiling user eligibility and accessibility of managed servers and operations (server management operations authorization) is one aspect of the multi-phased controls to minimize risks associated with endpoint pooling according to some embodiments of the invention. Server management operations include basic commands, or automation scripts and programs.

The automation content meta-data stored in the meta-data and automation content repository 104 includes, for example, risk properties 402, role definitions 404, functions 406, signatures 408, read/write access 410 and permissions 412. The risk properties 402 characterize the risk levels, which in turn help determine the role definition 404 and eligibility. The functions 406 and signatures 408 are characteristics of management operations which are indifferent to role definition 404. Read/Write Access 410 and permissions 412 are determined by role. The role definition 404 is associated with a user/role profile 106/316 and subject to the user/role authorization process 118 of the deployment module 112 to determine user/role authorization. Other meta-data and authorization content stored in the meta-data and automation content repository 104 include one or more on/off switches 414 to control access to the customer profiles 106, used by the customer authorization process 116 in the deployment module 112.

Note that the customer profile and user and/or role profile are both designated by reference character 106 in FIG. 4 for consistency with the labeling of element 106 in FIG. 1.

In some cases, the customer profile is linked to the managed servers and on/off switches. For example, some customers have strict rules and/or policies. They may not want lower rank operators to do some actions on their servers. These customer policies or profiles should determine who can run what operations on what servers.

Figure 5:
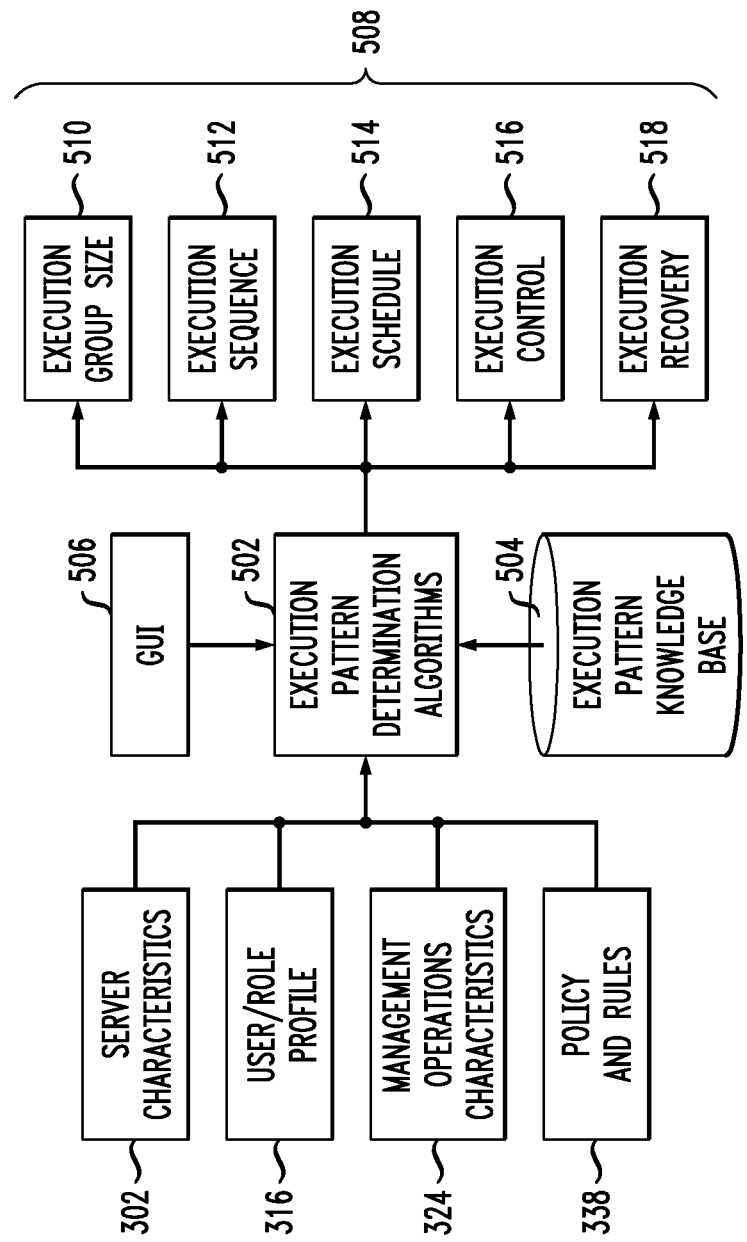
FIG. 5 depicts an exemplary flow according to an aspect of the invention.

FIG. 5 depicts an exemplary flow for determining an execution pattern according to some embodiments of the invention. The determined execution patterns are one aspect of the multi-phased controls to minimize risks associated with endpoint pooling according to some embodiments of the invention. In some embodiments, execution pattern determination algorithms 502 are used to determine the execution patterns. Server characteristics 302, user and/or role profiles 316, management operations characteristics 324 and policy and rules 338, as well as an execution pattern knowledge base 504, and a graphic user interface (GUI) 506 provide inputs to the execution pattern determination algorithm 502. The GUI (or other suitable data input/output functionality) is provided for user control of the algorithms 502. The execution pattern determination algorithm 502 uses this input information to determine an execution pattern 508. In some embodiments, information from each category is input to the execution pattern determination algorithm 502, and in other embodiments, information from less than each category is input to the execution pattern determination algorithm 502. In one or more embodiments, the execution pattern 508 includes several components: execution group/unit size 510, an execution sequence 512, an execution schedule 514, execution control 516 and execution recovery 518. In some embodiments, the execution pattern 508 includes information for each component, while in other embodiments the execution pattern 508 includes information for less than each component.

The execution group/unit size 510 is the number of endpoints included in the pool. The execution sequence 512 is the order in which the management operations/commands will be executed in parallel on the endpoints. The execution schedule 514 sets forth when and under what conditions the particular management operations and/or commands will be executed. Execution control 516 is appropriate in at least some embodiments. Execution recovery 518 sets forth the steps to execute in the event the execution of the management operations fails, and a prior state needs to be recovered.

Figure 6:
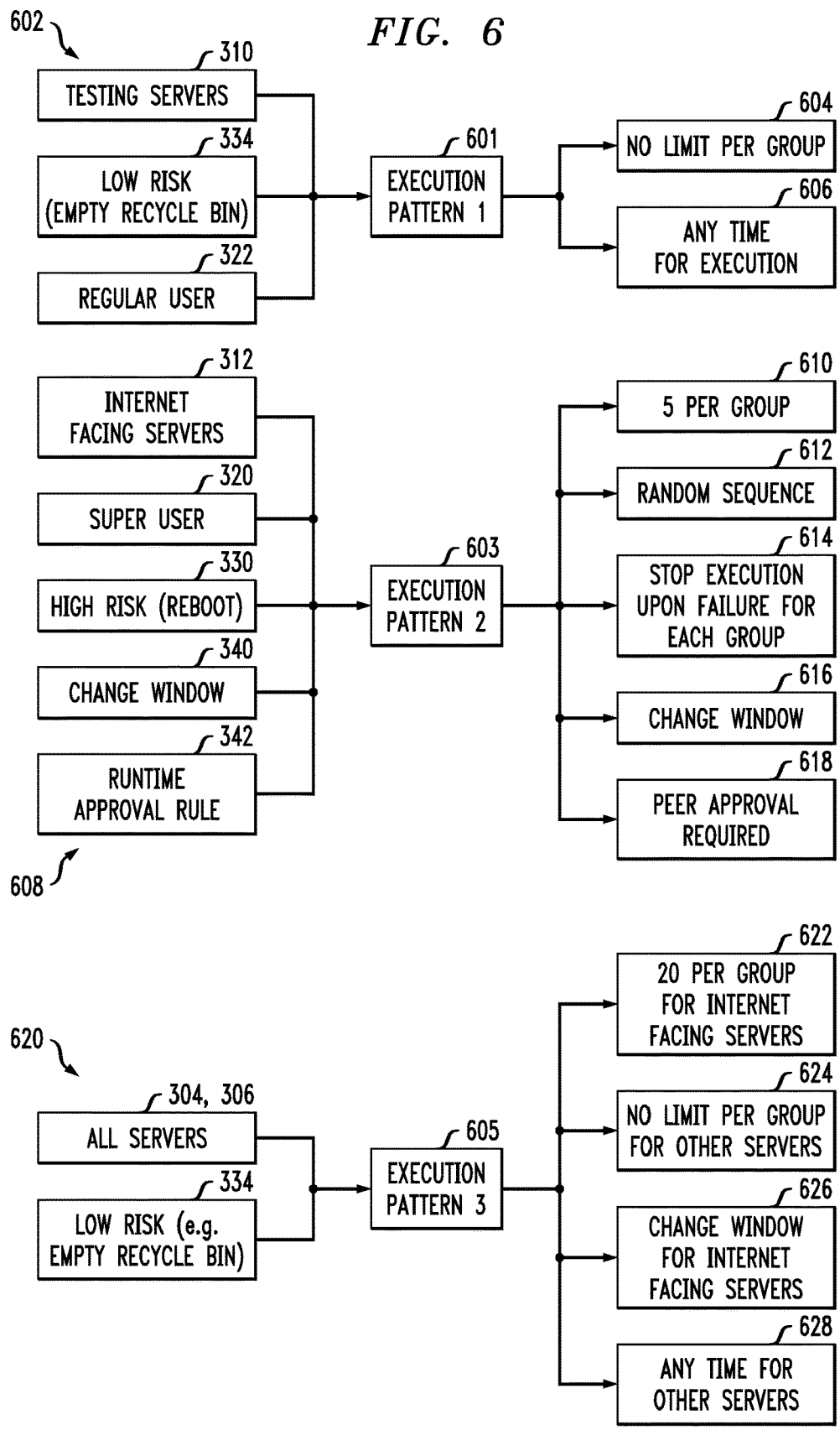
FIG. 6 presents exemplary execution patterns according to an aspect of the invention.

Turning to FIG. 6, some examples execution pattern determination are provided. In a first exemplary aspect 602, the input to a first execution pattern 601 includes testing servers 310 (example of server characteristics 302), low risk (e.g., empty recycle bin) 334 (example of management operations characteristics 324), and regular user 322 (example of user and/or role profile 316). The output from the first execution pattern 601 includes no limit per group size 604 (example of execution group size 510), and any time for execution 606 (example of execution schedule 514).

In a second exemplary aspect 608, the input to a second execution pattern 603 includes internet facing servers 312 (example of server characteristics 302), super user 320 (example of user and/or role profile 316), high risk (e.g., reboot) 330 (example of management operations characteristics 324), change window 340 (example of policy and rules 338) and runtime approval rule 342 (example of policy and rules 338). The output from the second execution pattern 603 includes five per group 610 (example of execution group size 510), a random sequence 612 (example of execution sequence 512), an instruction to stop execution upon failure for each group 614 (example of execution control 516), a change window 616 (example of execution schedule 514), and peer approval requirements 618 (example of execution control 516).

In a third exemplary aspect 620, the input to a third execution pattern 605 includes all servers 304, 306 (example of server characteristics 302), and low risk (e.g., empty recycle bin) 334 (example of management operation characteristics 324). The output from the third execution pattern 605 includes twenty per group for internet facing servers 622 (example of execution group size 510), no limit per group for other servers 624 (example of execution group size 510), change window for internet facing servers 626 (example of execution schedule 514) and any time for non-internet facing servers (other servers) 628 (example of execution schedule 514).

Figure 7:
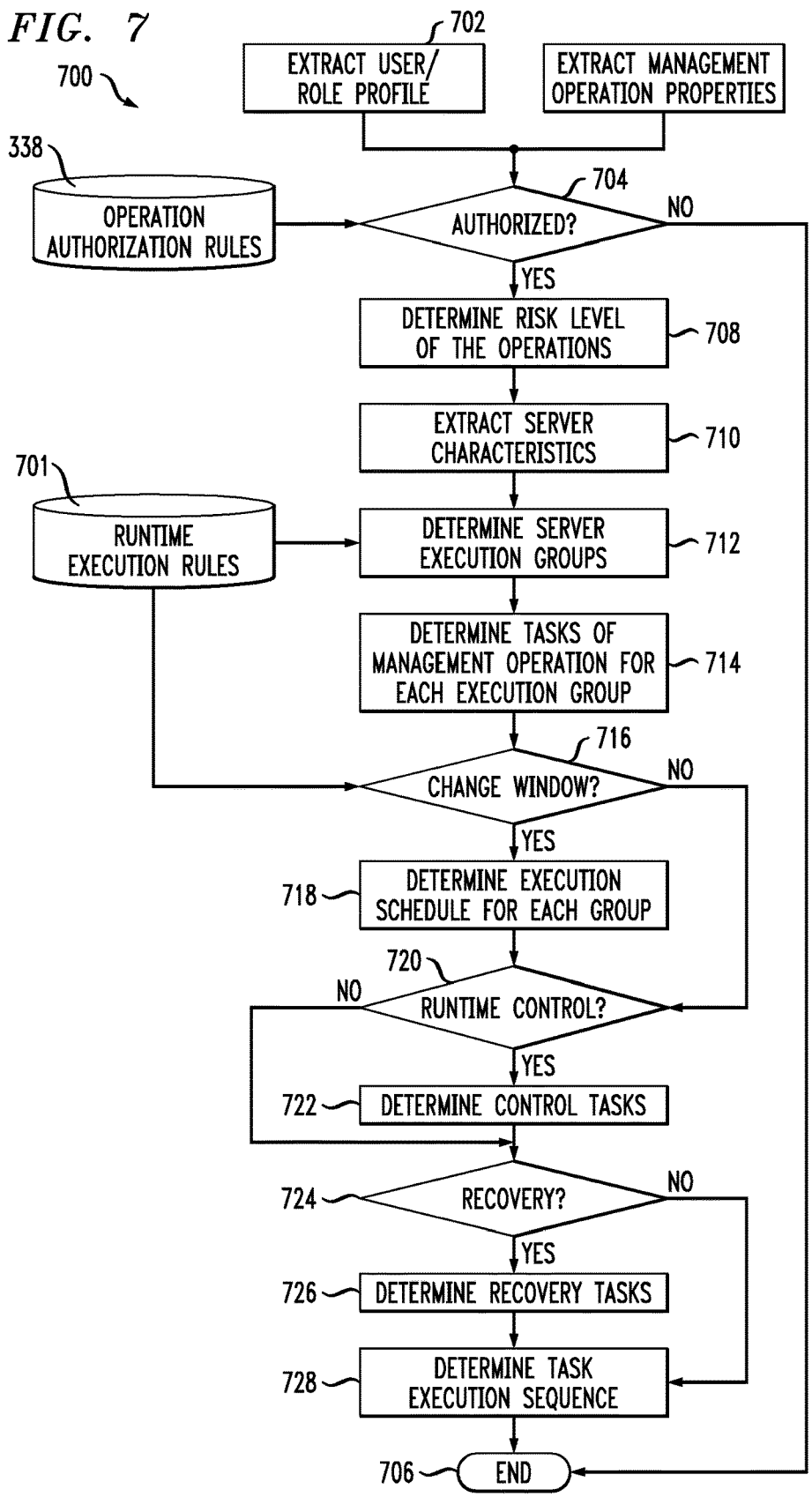
FIG. 7 presents a flowchart depicting details of an exemplary embodiment according to an aspect of the invention.

Turning now to FIG. 7, a non-limiting exemplary method 700 is depicted therein. In step 702, a user and/or role profile 316 and management operation properties 324 are extracted from the data store 102. In step 704, a determination is made whether the user is authorized. The operation authorization rules 338 are used as a factor in this determination. If not authorized, the process ends in 706. If authorized, a risk level of the operations is determined in 708. Then the server characteristics 302 are extracted from the data store 102 in 710. In step 712, server execution groups are determined. In one or more embodiments, runtime execution rules 701 from the data store 102 are factored into the determination of server execution groups. In step 714, the management operation tasks for each execution group are determined. A determination is made at step 716 whether there is a change window. The runtime execution rules 701 are factored into the determination of whether there is a change window. As used herein, a change window (e.g., permitted downtime) is a period of time defined for one or more configuration items (CI), which specifies when the CIs can be taken out of service for changes to be made. A configuration item is any component of an IT infrastructure that is under the control of configuration management. If there is a change window, an execution schedule for each group is determined in step 718, and then a determination is made in decision block 720 whether there is runtime control 516. If there is no change window in 716, the method proceeds to step 720 for the determination of whether there is runtime (execution) control 516. If it is determined at 720 that there is runtime control, the control tasks are determined in step 722, and a determination is made at 724 whether there is execution recovery 518. If there is no runtime control, the method proceeds to step 724, and a determination is made whether there is execution recovery 518. If it is determined at 724 that there is execution recovery, the recovery tasks are determined in 726, and the task execution sequence is determined in step 728. If there is no execution recovery at 724, the method proceeds to step 728 to determine a task execution sequence. The method 700 then ends at 706, and an execution pattern has been determined.

It will be appreciated that in some instances, in a workflow to determine the execution pattern, in some cases, servers are initially grouped based upon characteristics such as whether the server is a testing server, development server, production server, Internet-facing server, or other kind of server. Furthermore, in some cases, further grouping of servers can be carried out based on additional characteristics, and/or meta-data can be extracted from all servers.

Figure 8:
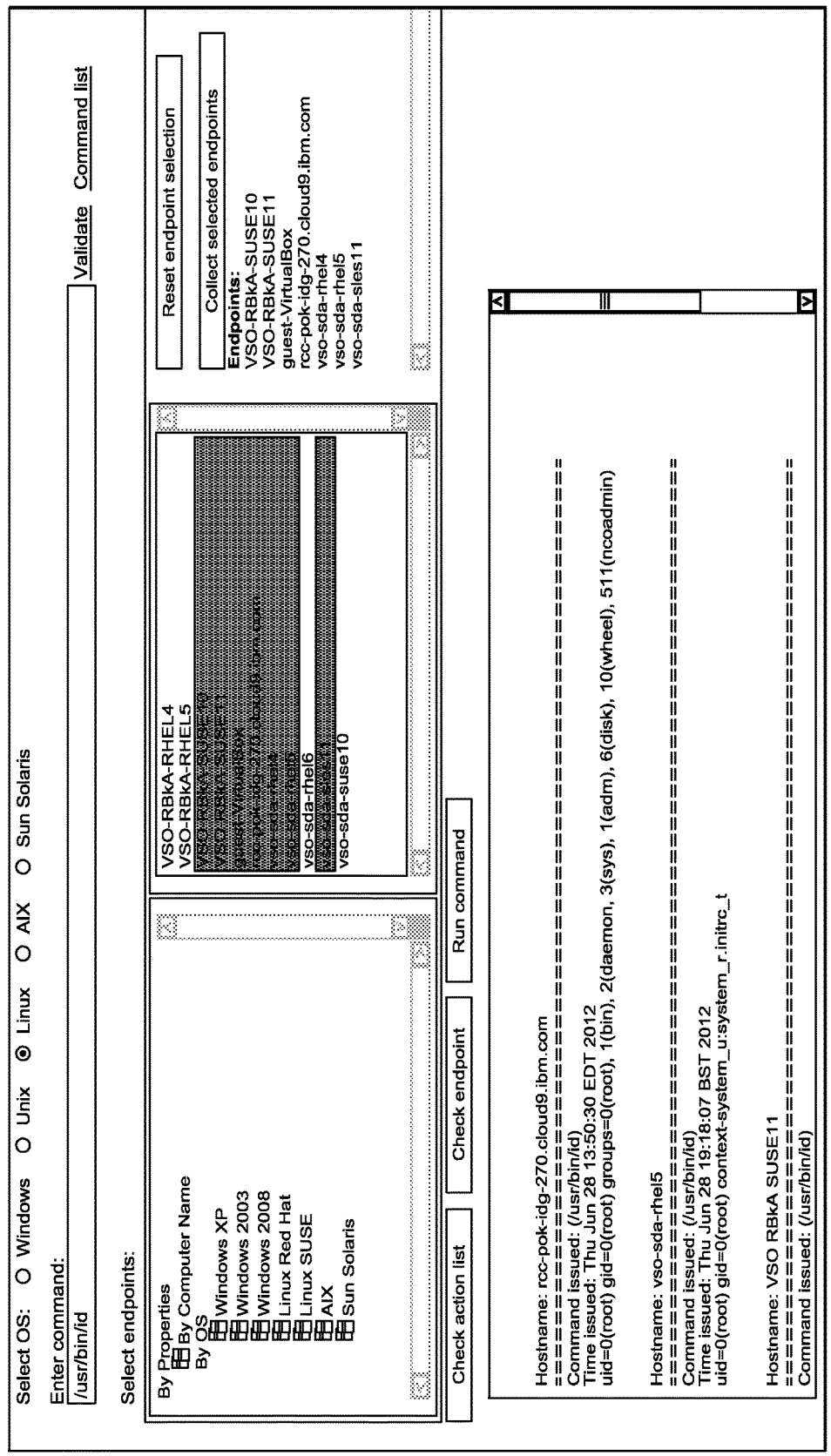
FIG. 8 presents a screen from a prior art approach.

Turning to FIG. 8, a conventional Runbook automation implementation is shown. The conventional implementation includes a graphical user interface (GUI) that includes a command line field. The GUI provides for: the display of endpoints applicable to the selected platform, the selection of endpoints for the command execution, validation commands to be executed onto endpoints; and collecting and displaying execution results from multiple endpoints in one screen.

Figure 9:
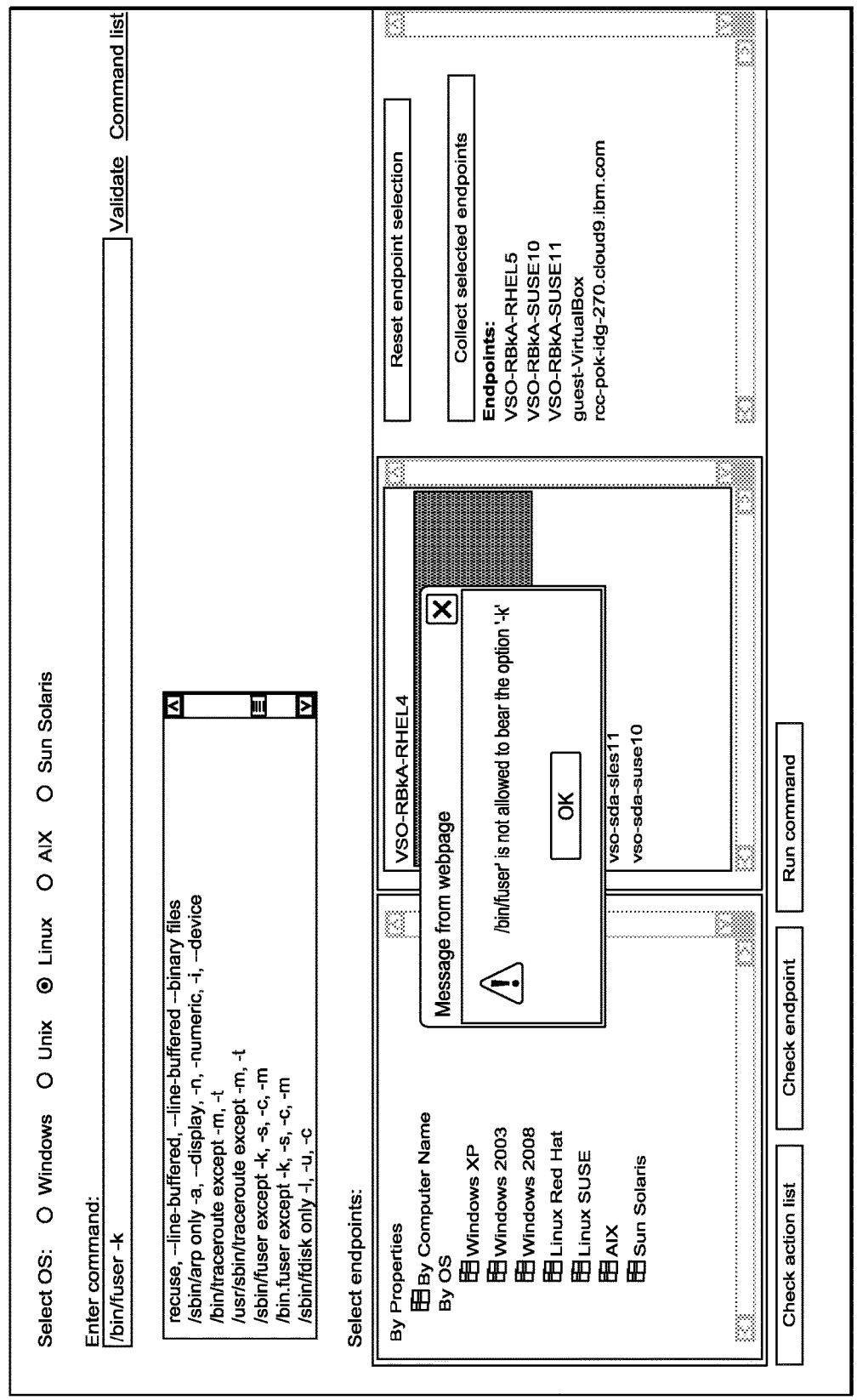
FIG. 9 presents an exemplary screen according to an aspect of the invention.

In comparison, FIG. 9 provides an automation implementation according to aspects of the invention. In some embodiments, commands are validated against a list of allowed or forbidden commands. This validation process allows for the definition of an "OK" list of allowed commands (including allowed options) and a "NOT OK" list of forbidden commands. The validation process parses the command string (including concatenated or piped commands) and validates each command against the lists. Further, the validation process prevents execution of commands in the NOT OK list, and of commands not in the OK list.

Figure 10A:
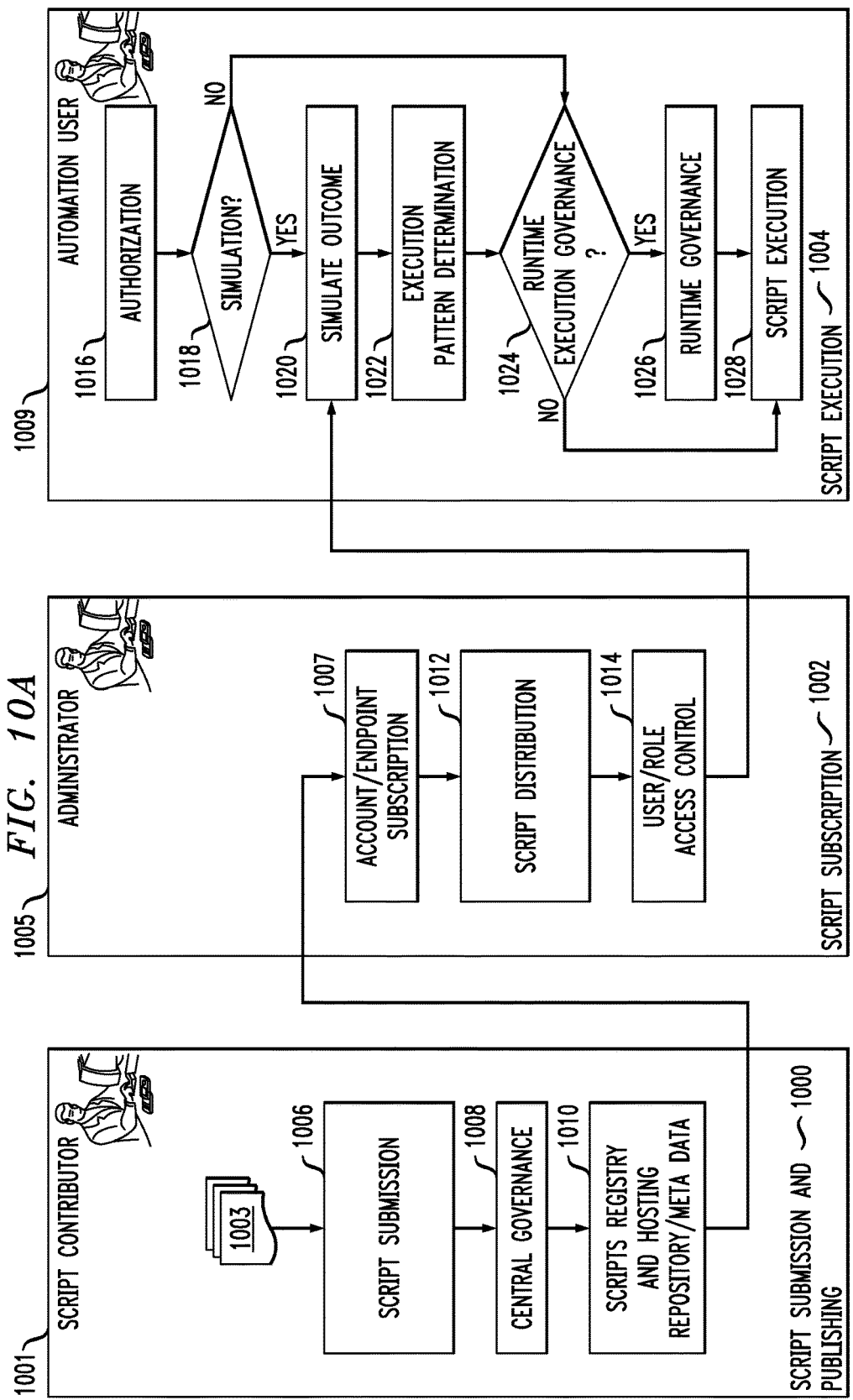
FIG. 10A presents a flowchart depicting details of an exemplary embodiment according to an aspect of the invention.

Turning now to FIGS. 10A and 10B, a non-limiting exemplary method is depicted therein. Some embodiments provide a framework to rapidly harvest account specific scripts/commands in shared infrastructure. The three environments that are part of the framework are a script submission and publishing environment 1000, a script subscription environment 1002 and a script execution environment 1004. In the script submission and publishing environment 1002, begin with a script contributor 1001, who submits a script 1003 at step 1006. A central governance reviews the scripts at step 1008. In some embodiments a script discovery service supports discovering high value scripts. After approval by the central governance, the script is transferred to a script registry and hosting repository (optionally with meta-data) in step 1010. In some embodiments, script hosting repositories (e.g., file based and object based) are at various levels (e.g., per endpoint level, per account level, per shared framework level, per geographic level, per global level, etc.). In one or more embodiments, a script register service supports registering the script to authorized repositories. The focus then shifts to the script subscription environment 1002. In some embodiments, script sharing services support distributing scripts to authorized entities (users, roles, domains, target endpoints, etc.). In one or more embodiments, an administrator 1005 in the script subscription environment 1002 has an account/endpoint subscription 1007 to the script registry. Per this subscription, the script 1003 is distributed to the account at 1012. In one or more embodiments, the script subscription service authorizes scripts onto target endpoints and determines whether the script is eligible for use by a particular user. In step 1014, user/role access to the script 1003 is determined.

The focus then shifts to the script execution environment 1004, where an automation user 1009 executes the script 1003 on a pool of endpoints in parallel. After the automation user 1009 is authorized (via e.g. authorization process per deployment module 112) to execute the script 1003 in step 1016, a determination is made in step 1018 whether to simulate the execution of the script. In one or more embodiments, a script validation service validates the hosted and/or distributed scripts via simulation. If simulated, the script 1003 is subject to a simulation process, and a simulated outcome is produced at step 1020. Then an execution pattern determination is made at step 1022. In step 1024, it is determined whether there is runtime execution governance. If it is decided in step 1018 not to simulate the execution of the script, the method proceeds to step 1024.

If there is runtime execution governance, the method proceeds to step 1026 and the runtime governance is carried out, and then the script is executed at 1028. If there is no runtime execution governance, the method proceeds to step 1028 where the script is executed. In one or more embodiments, a script execution service invokes the scripts on the target environments.

Turning now to FIG. 10B, the method depicted in FIG. 10B is similar to the method described with respect to FIG. 10A, except after user and/or role access to the script is determined in step 1014, the method moves to 1016 where the automation user 1009 receives authorization to execute the script, as opposed to FIG. 10A, where after step 1014, a simulated outcome is provided in step 1020.

In some embodiments, deployment module 112 is used to set up the user profiles and/or roles, and/or to pre-populate other databases in data store 102. Then, execution module 114 is used; e.g., in production.

Given the discussion thus far, it will be appreciated that, in general terms, an exemplary method, according to an aspect of the invention, includes the step of determining whether a user is authorized to carry out a management operation on a plurality of information technology assets in parallel. The determination is based on the role of the user and at least one characteristic of the management operation. This step is implemented, for example, at least in part by querying data store 102 with database-querying functionality (e.g., a relational database management system) in module 114. The database-querying functionality could include, for example, a database management system software module executing on at least one hardware processor.

Another method step includes determining of a risk level of the management operation; this step is also implemented, for example, at least in part by querying data store 102 with database-querying functionality in module 114. Still another method step includes determining at least one characteristic of the plurality of information technology assets; this step is also implemented, for example, at least in part by querying data store 102 with database-querying functionality in module 114. Yet another method step includes specifying the execution pattern for the management operation based on the risk level and the at least one characteristic of the plurality of information technology assets. This step is implemented, for example, at least in part by execution pattern determination sub-module 124 (e.g. in the form of an execution pattern determination module executing on the at least one hardware processor). A further method step includes carrying out the management operation on the plurality of information technology assets in parallel, in accordance with the execution pattern. This step can be implemented, for example, by a script execution environment module 1004 executing on the at least one hardware processor.

In some cases, the step of specifying the execution pattern further includes specifying an execution group size, an execution sequence, and an execution schedule. Refer, e.g., to FIG. 5 and accompanying text. Specifying of the execution schedule can include, for example, specifying a change window. Specifying the execution pattern can include, for example, specifying execution control tasks and recovery tasks.

In some cases, the management operation includes running an automation content executable.

In some cases, the characteristics of the management operation include a categorization of intrusive or non-intrusive; in at least some such cases, non-intrusive content is without risk, and intrusive content is associated with one or more different levels of risk.

In some cases, a further step includes previewing a simulated outcome of the management operation. See, e.g., step 206.

In some cases, a further step includes carrying out the management operation on a small group of managed servers or other information technology assets for testing.

In some cases, at least some of the plurality of information technology assets are servers, and the determining of the at least one characteristic of the plurality of information technology assets includes classifying the servers according whether a given one of the servers is a production server or non-production server; an internet-facing server or a non-internet-facing server; and the like.

One or more embodiments of the invention, or elements thereof, can be implemented in the form of an apparatus including a memory and at least one processor that is coupled to the memory and operative to perform exemplary method steps.

Figure 11:
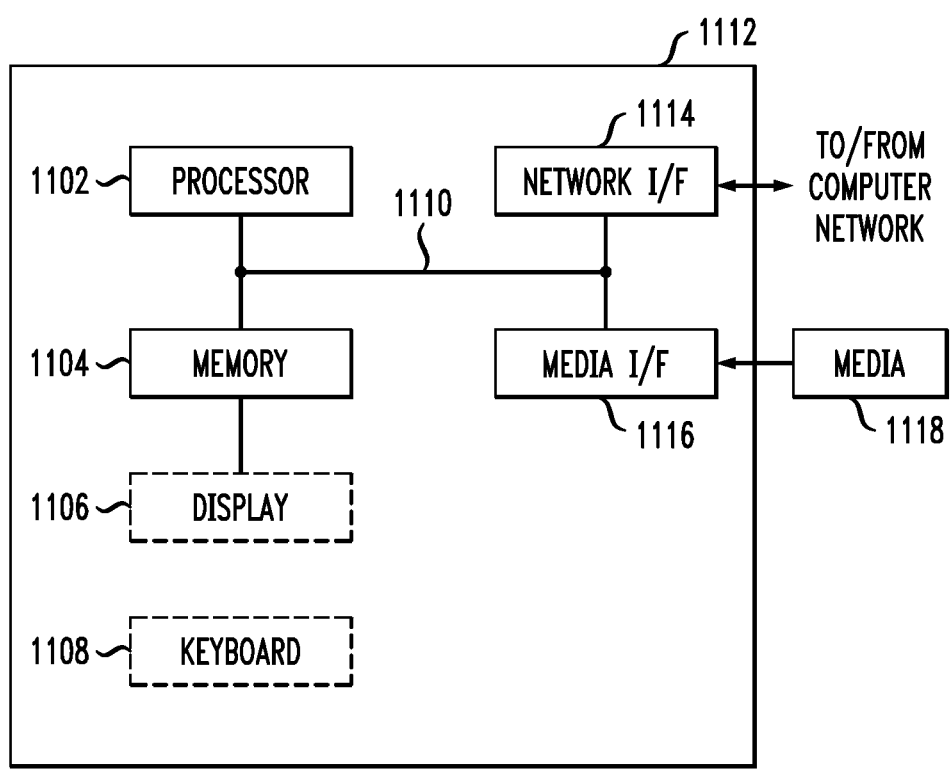
FIG. 11 depicts a computer system that may be useful in implementing one or more aspects and/or elements of the invention.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An automated method for providing operation risk management in a multimode endpoint environment, said method comprising:
determining that a user is authorized to carry out a management operation on a plurality of information technology assets in parallel, said determination being based on a role of said user and at least one characteristic of said management operation to be executed, wherein an execution of said management operation includes an execution of automation content;
determining to preview a simulated outcome of said management operation running across said plurality of information technology assets in parallel based on an execution rule; determining a risk level of said management operation responsive to said simulated outcome;
determining at least one characteristic of said plurality of information technology assets;
based on said risk level and said at least one characteristic of said plurality of information technology assets, specifying an execution pattern including multi-phased controls for executing said management operation across said plurality of information technology assets in parallel;
and carrying out said execution of said management operation on said plurality of information technology assets in parallel,
wherein the execution of said execution pattern is based on the characteristics of the information technology asset, the user and the management operation.

2. The method of claim 1, wherein said execution pattern specifies a first plurality of said information technology assets in a first endpoint pool and a second plurality of said information technology assets in a second endpoint pool, and an execution sequence and an execution schedule, wherein said management operation is carried out on said first endpoint pool in parallel and on said second endpoint pool in parallel, and wherein said management operation is carried out on said first and second endpoint pools in accordance with said execution sequence and said execution schedule.

3. The method of claim 2, wherein said specifying of said execution schedule comprises specifying a change window defining a time for carrying out said execution of said management operation.

4. The method of claim 2, wherein said step of specifying said execution pattern further comprises specifying execution control tasks and recovery tasks.

5. The method of claim 1, wherein said management operation comprises running an automation content executable.

6. The method of claim 1, wherein said characteristics of said management operation comprise a categorization of intrusive or non-intrusive.

7. The method of claim 6, wherein non-intrusive content is without risk, and intrusive content is associated with one or more different levels of risk.

8. The method of claim 1, further comprising previewing a simulated outcome of said management operation.

9. The method of claim 1, further comprising carrying out said management operation on a small group of managed servers or other information technology assets for testing.

10. The method of claim 1, wherein at least some of said plurality of information technology assets comprise servers, and wherein said determining of said at least one characteristic of said plurality of information technology assets comprises a classification of said servers according to at least one of:
production server or non-production server; and
internet-facing server or non-internet-facing server.

11. The method of claim 1, wherein:
said step of determining that said user is authorized to carry out said management operation, said step of determining said risk level of said management operation, and said step of determining said at least one characteristic of said plurality of information technology assets is implemented by querying a data store with a database management system module executing on at least one hardware processor;
said step of, based on said risk level and said at least one characteristic of said plurality of information technology assets, specifying said execution pattern for said management operation, is implemented by an execution pattern determination module executing on said at least one hardware processor; and
said step of carrying out said management operation on said plurality of information technology assets in parallel, in accordance with said execution pattern, is implemented by a script execution environment module executing on said at least one hardware processor.

12. An apparatus for providing operation risk management in a multimode endpoint environment, said apparatus comprising:
a memory; and
at least one processor, coupled to said memory, said at least one processor being operative to:
determine that a user is authorized to carry out a management operation on a plurality of information technology assets in parallel, said determination being based on a role of said user and at least one characteristic of said management operation to be executed, wherein an execution of said management operation includes an execution of automation content;
determine to preview a simulated outcome of said management operation running across said plurality of information technology assets in parallel based on an execution rule;
determine a risk level of said management operation responsive to previewing a said simulated outcome;
determine at least one characteristic of said plurality of information technology assets;
based on said risk level and said at least one characteristic of said plurality of information technology assets, specify an execution pattern including multi-phased controls for executing said management operation across said plurality of information technology assets in parallel;
and carry out said execution of said management operation on said plurality of information technology assets in parallel, wherein the execution of said execution pattern is based on the characteristics of the information technology asset, the user and the management operation.

13. The apparatus of claim 12, wherein said execution pattern specifies a first plurality of said information technology assets in a first endpoint pool and a second plurality of said information technology assets in a second endpoint pool, and an execution sequence and an execution schedule, wherein said management operation is carried out on said first endpoint pool in parallel and on said second endpoint pool in parallel, wherein said management operation is carried out on said first and second endpoint pools in accordance with said execution sequence and said execution schedule.

14. The apparatus of claim 13, wherein said at least one processor is further operative to specify said execution schedule by specifying a change window defining a time for carrying out said execution of said management operation.

15. The apparatus of claim 13, wherein said at least one processor is further operative to specify said execution pattern by specifying execution control tasks and recovery tasks.

16. The apparatus of claim 12, wherein said management operation comprises running an automation content executable.

17. The apparatus of claim 12, wherein said characteristics of said management operation comprise a categorization of intrusive or non-intrusive.

18. The apparatus of claim 17, wherein non-intrusive content is without risk, and intrusive content is associated with one or more different levels of risk.

19. The apparatus of claim 12, wherein said at least one processor is further operative to preview a simulated outcome of said management operation.

20. The apparatus of claim 12, wherein said at least one processor is further operative to carry out said management operation on a small group of managed servers or other information technology assets for testing.

21. The apparatus of claim 12, wherein at least some of said plurality of information technology assets comprise servers, and wherein said at least one processor is further operative to determine said at least one characteristic of said plurality of information technology assets via a classification of said servers according to at least one of:

production server or non-production server; and
internet-facing server or non-internet-facing server.

22. A non-transitory computer program product comprising a computer readable storage medium having program instructions embodied therewith, wherein the program instructions are executable by a processor to cause the processor to perform a method for providing operation risk management in a multimode endpoint environment, said method comprising:

determining that a user is authorized to carry out a management operation on a plurality of information technology assets in parallel, said determination being based on a role of said user and at least one characteristic of said management operation to be executed, wherein said management operation includes an execution of automation content;

determining to preview a simulated outcome of said management operation running across said plurality of information technology assets in parallel based on an execution rule;

determining a risk level of said management operation responsive to said simulated outcome;

determining at least one characteristic of said plurality of information technology assets;

based on said risk level and said at least one characteristic of said plurality of information technology assets, specifying an execution pattern including multi-phased controls for executing said management operation across said plurality of information technology assets in parallel; and carrying out said execution of said management operation on said plurality of information technology assets in parallel, wherein the execution of said execution pattern is based on the characteristics of the information technology asset, the user and the management operation.

* * * * *